United States Patent
Balke et al.

[15] 3,698,663
[45] Oct. 17, 1972

[54] ROTARY WING PYLON MOUNTING SYSTEM

[72] Inventors: Rodney Worth Balke; Robert Reed Lynn, both of Arlington; Rodney Keith Wernicke, Hurst, all of Tex.

[73] Assignee: Textron, Inc., Providence, R.I.

[22] Filed: Dec. 7, 1970

[21] Appl. No.: 95,535

[52] U.S. Cl............................................244/17.27
[51] Int. Cl..............................................B64c 27/00
[58] Field of Search...................244/17.27; 248/358

[56] References Cited

UNITED STATES PATENTS

| | | |
|---|---|---|
| 3,502,290 | 3/1970 | Legrande et al....244/17.27 X |
| 2,739,769 | 3/1956 | Rogers....................244/17.27 |
| 3,163,378 | 12/1964 | Balke et al..............244/17.27 |

Primary Examiner—Harvey C. Hornsby
Assistant Examiner—H. S. Lane
Attorney—Ryder, McAulay & Hefter

[57] ABSTRACT

A pylon mounting system that employs four non-resilient links to support the pylon on the fuselage. The top end of each link is mounted by spherical bearings to the pylon. The bottom end of each link is mounted by spherical bearings to the fuselage. The longitudinal axes of the links intersect at a predetermined point along the mast axis below or above the normal mounting plane. The pylon is thus constrained by the four links to execute small, vibrational motions about this point of intersection. As a consequence, in-plane vibrational forces from the rotor blades are transmitted to the fuselage as an in-plane vibrational force at this point of intersection. A first moment about the center of gravity of the fuselage is created by this in-plane focused force. In addition, there are elastomeric elements between the fuselage and the pylon which provide an in-plane restoring force in response to rotor blade induced pylon vibrations. This restoring force provides a second moment about the fuselage center of gravity. The point of intersection of the links and of the spring rate of the elastomeric elements are selected such that these first and second moments tend to cancel one another.

Pylon inertial reaction is enhanced because the pylon rotates about this point of intersection. Thus, isolation of the fuselage is enhanced.

8 Claims, 2 Drawing Figures

INVENTORS
RODNEY W. BALKE
ROBERT R. LYNN
RODNEY K. WERNICKE
BY Ryder, McAuley & Hefter
ATTORNEYS

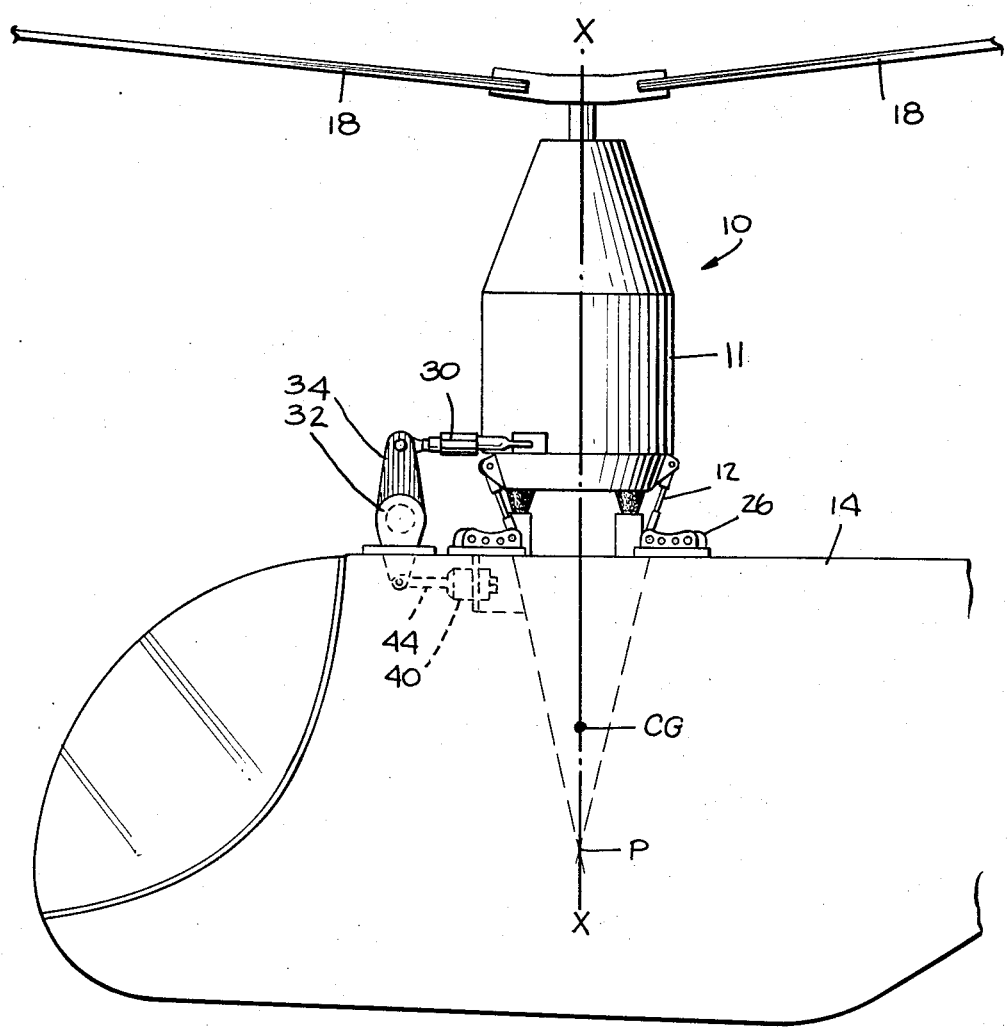

ROTARY WING PYLON MOUNTING SYSTEM

This invention relates in general to a pylon mounting system for rotary wing aircraft and more particularly to a pylon mounting system which minimizes the pitch and roll motion of the fuselage in response to rotor blade vibratory forces.

BACKGROUND OF THE INVENTION

In rotary wing aircraft, such as helicopters, the operation of the rotor blades generates low frequency vibratory forces which are transmitted to the fuselage through the pylon and pylon mounts. These forces are due to periodic, asymmetric airflow over the rotating rotor blades, as well as to the vibratory steady state forces on the rotating system as a result of rotor blade unbalance or rotor blade out of track. Among the more undesirable consequences of these forces is fuselage pitch, roll and bending.

Thus, it is desirable to isolate the fuselage from these rotor blade induced forces. Such isolation not only enhances crew and passenger comfort, but also improves component reliability and prolongs component service life. As a consequence, isolation permits greater operating speed and increases the performance capability of the rotary wing aircraft.

Various isolation systems have been employed to achieve a decrease in the transmission to the fuselage of the low frequency vibratory forces induced by rotor blade operation. One simple isolation system employs elastomeric mounts between fuselage and pylon. The elastomeric mounts permit pylon deflection in response to rotor blade vibration. The pylon deflection provides a pylon inertial reaction to the aerodynamic and rotor blade vibratory forces which tends to decrease the transmission of these vibratory forces from the rotor to the fuselage. Considerations of static loading and rotor-pylon stability provide limits on the spring rate that can be employed for these elastomeric mounts. Thus, the magnitude of isolation achieved is limited by these other design considerations.

One pylon mounting system for providing reduced fuselage response to rotor induced vibratory disturbances is described in U.S. Pat. No. 3,163,378. In the 3,163,378 patent, a pylon mount is shown which provides a degree of isolation for pylon lateral and longitudinal vibratory motion in response to rotor blade induced vibrations. The mount is designed such that the lateral pylon motion is rotational motion about a predetermined substantially longitudinal axis displaced from the mounting plane. In this fashion, a degree of control over the inertial reaction of the pylon to rotor blade induced vibrations is obtained and thus some control over the amount of isolation, at least as to roll, is obtained.

However, the known systems provide only a limited degree of isolation and where that isolation is enhanced, as in the 3,163,378 patent, the enhanced isolation is limited to one component of vibratory disturbance.

Accordingly, it is a major purpose of this invention to provide an enhanced isolation of the fuselage from rotor blade induced vibratory disturbances.

It is a further purpose of this invention that this enhanced isolation be provided by a mounting structure that will transmit the large steady state forces and long term transients between pylon and fuselage while serving to isolate the vibratory disturbances.

More specifically, it is an important purpose of this invention to provide a pylon mounting system which will provide a minimum of fuselage response to vibratory forces present in the pylon and rotor structure while at the same time providing transmission to the fuselage of lift, manuevering and rotor counter-torque forces.

It is a particular purpose of this invention to minimize fuselage roll, pitch and bending response to rotor blade vibratory disturbances.

Because the device is on an aircraft, it is further important that the invention involve a design which will accomplish all of the above purposes in a highly reliable, yet simple and inexpensive device of the lowest possible weight.

BRIEF DESCRIPTION OF THE INVENTION

Briefly, one embodiment of this invention includes a pylon mounting system having three or more links positioned at intervals around the base of the pylon. These links serve to mount the pylon on the fuselage. One end of each link is attached to the pylon through spherical bearings. The other end of each link is attached to the fuselage also through spherical bearings. The pylon links are attached so that their axes intersect at a single point in space. This point is generally substantially above or substantially below the mounting plane of the pylon on the fuselage. This point of axes intersection is called herein the "focal point." Because there are at least three links, and each link has spherical bearings at both end points, a mounting structure is provided that constrains pylon pitch and roll movements relative to the fuselage to rotational movement about only this focal point. As a consequence, vibrational forces on the pylon, and in particular those vibrational forces induced by the rotor blades, are transmitted to the fuselage as a net force focused at the focal point.

In addition to these mounting links between fuselage and pylon, there are rubber-type elastomeric elements between fuselage and pylon that serve to provide a restoring force in response to pylon displacement. Rotor blade induced vibratory pylon movement strains these elastomeric elements, thereby providing a restoring force. The restoring force on the pylon is matched by a complementary force on the fuselage since these elastomeric elements are attached between pylon and fuselage. The in-plane component of the restoring force on the fuselage produces a moment about the center of gravity of the fuselage which tends to cause the fuselage to rotate about the center of gravity, thus inducing roll and/or pitch vibrations.

By selecting the above-mentioned focal point an appropriate distance below the fuselage center of gravity, the in-plane component of the focused pylon and rotor blade vibrational forces will provide another moment about the center of gravity of the fuselage which will tend to produce roll and/or pitch fuselage vibrations. By proper selection of the position of this focal point, having regard to the magnitude of the restoring forces and the magnitude of the rotor blade induced vibrational forces, this focused force moment is designed to substantially cancel the restoring force moment. It should be noted that this moment cancellation will occur at a predetermined frequency. The predominant rotor harmonic is preferably selected as this frequency. In this fashion, pitch and roll response of the fuselage to rotor blade vibrational forces is minimized.

In addition, the inertial reaction of the pylon to disturbing vibratory forces is enhanced by an amount that is a function of the distance the focal point is from the pylon center of gravity. This enhance pylon inertial reaction means enhanced isolation of fuselage from pylon vibratory disturbances.

BRIEF DESCRIPTION OF THE DRAWINGS

Other objects and purposes will become more apparent from the following detailed description and drawings in which:

FIG. 2 is an elevational view of the FIG. 1 embodiment.

DETAILED DESCRIPTION OF THE PREFERRED EMBODIMENT

Figure 1:
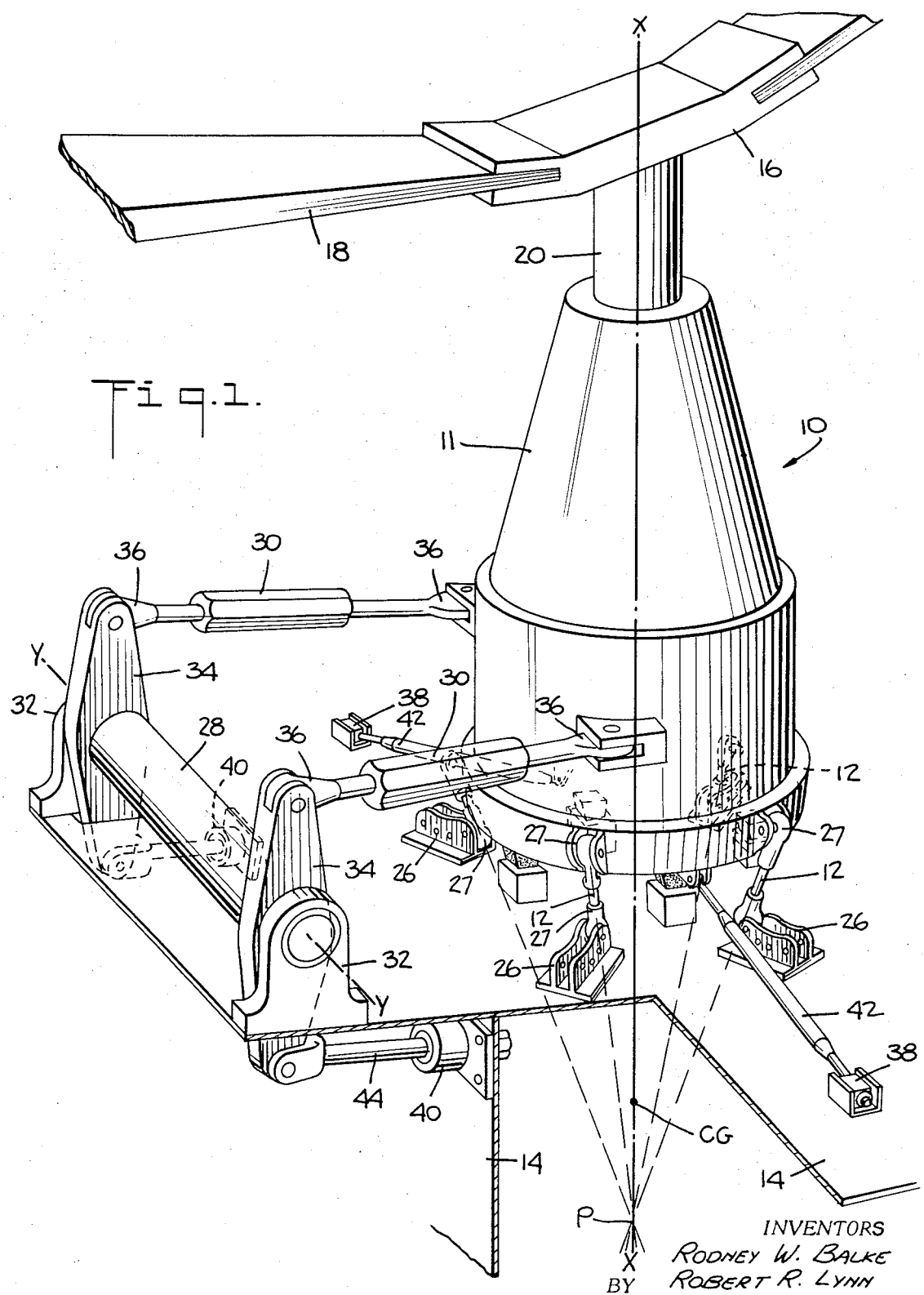
FIG. 1 is a perspective view of an experimental embodiment of this invention.

FIGS. 1 and 2 represent a single embodiment of this invention. As shown therein, there is a pylon 10 mounted by means of four links 12 on top of a fuselage 14. As used herein the term "pylon" refers essentially to the gear box 11, transmission and rotor shaft 20 contained therein but is not intended to include the rotor 16 and rotor blades 18. Spherical self-lubricating bearings 27 are used on each end of each mounting link 12 in order to provide a degree of universal rotational movement between each mounting link 12 and the pylon 10, as well as between each mounting link 12 and the fuselage 14. The brackets 26 that are shown are simply one means for connecting the fuselage 14 to the links 12.

The links 12 are oriented so that the longitudinal axes of the links 12 intersect at a point P. The point P is substantially below the center of gravity of the loaded fuselage. This intersection point P is located as close to the rotor shaft axis X—X as possible. As a consequence of this arrangement involving the links 12 so deployed and having spherical bearings 27 at each end of each link, the pylon 10 is constrained so that forces tending to generate lateral and longitudinal vibrational movements of the pylon 10 relative to the fuselage 14 will cause the pylon 10 to rotate about the point P.

The gears in the pylon transmission drive the rotor shaft 20 and as a result the gear box 11 itself tends to rotate about the rotor shaft axis X—X. Some mechanism must be used to hold the gear box 11 against such rotation. One such mechanism is illustrated in the figures and is basically a steel cylinder 28 and two links 30. The cylinder 28 is mounted to the fuselage 14 by brackets 32 and is mounted in such a fashion that the cylinder 28 is free to rotate within the brackets 32 about the cylinder 28 axis Y—Y. At each end of the cylinder 28 there are arms 34 which are affixed to the cylinder 28 and thus rotate with the cylinder 28. One end of each link 30 is connected through a spherical bearing 36 to the upper end of one of the arms 34. The other ends of the links 30 are connected through spherical bearings 36 to opposed sides of the pylon 10. As the gear box 11 tends to rotate, one of the links 30 will push one of the arms 34, while the other link 30 will pull the other arm 34. As a consequence, a torque will be applied to the steel cylinder 28 and the counter-torque generated will resist rotational movement of the gear box 11.

It should be noted that there are other techniques for applying a restraint to the rotation of the gear box 11. Thus, a dual bell crank with a cylinder under compression or tension can be employed to achieve the same results. What is important is that the torque restraining mechanism be one that doe not otherwise constrain the gear box 11. A reason for employing the universal bearings 36 at each end of the two links 30 is in order to avoid having this torque restraining mechanism also constrain or modify the manner of the rotational movement of the pylon 10 about the point P as described above.

An important feature of the pylon mounting system are the elastomeric elements 38, 40 between pylon and fuselage. These elements 38, 40 serve both to hold the pylon 10 upright and to provide a restoring force when the pylon 10 is deflected by forces such as the rotor blade induced vibratory forces.

The two elastomeric elements 38 react to lateral displacements, while the two elastomeric elements 40 react to longitudinal displacements. Elastomeric elements 38 are shown as mounted directly to the fuselage 14. Links 42 connect the elastomeric elements 38 to the pylon 10. The elastomeric elements 40 are also shown mounted directly to the fuselage 14. Links 44 connect the elastomeric elements 40 to the lower ends of the arms 34 and thus through the links 30, to the pylon 10. The "longitudinal" elastomeric elements 40 could have been positioned and connected in a manner similar to that of the "lateral" elastomeric elements 38 but it was more convenient in the embodiment shown to provide the elements 40 in the manner shown. Indeed, if the appropriate elastomeric element were available, a single elastomeric element could be positioned under the pylon 10. This single elastomeric element would react to both lateral and longitudinal pylon displacements. The important point is that these elastomeric elements 38, 40 provide a restoring force in response to in-plane pylon 10 displacements. As a consequence, an inplane force is applied at the plane of the elastomeric elements 38, 40 to the fuselage tending to cause the fuselage 14 to roll and/or pitch and/or bend.

The disturbing forces that are applied to the pylon 10 and that produce the in-plane pylon displacements are transmitted by the links 12 to the fuselage. Because of the mount structure (that is the angle of the links 12 and spherical bearings 27) this transmitted force is focused at the point P. Thus, at the point P there is effectively an in-plane force acting on the fuselage.

With reference to the figures as shown, if it is assumed that the disturbing force focused at the point P is a force vector directed to the left, then since the center of gravity of the fuselage is above the point P, the force will tend to cause the fuselage to rotate clockwise in the plane of the figures.

The corresponding disturbing force acting on the pylon 10 will tend to displace the pylon to the left as shown in the figures. This leftward displacement of the pylon 10 results in a restoring force generated by the elastomeric elements 38 and 40 having a force vector directed to the right. But, of course, the force exerted on the fuselage 14 by the elastomeric elements has a force vector directed to the left. This restoring force as applied to the fuselage 14 is thus a force which, because it is above the center of gravity of the fuselage, will tend to cause the fuselage to rotate in a counter-clockwise direction in the plane of the figures.

This counter-clockwise movement is opposite to the clockwise movement due to the focused forces at the point P. Accordingly, the moments that tend to induce fuselage rotation due to the restoring forces of the elastomeric elements at the pylon mounting plane tend to be cancelled by the moments caused by the disturbing forces focused at the point P.

Although there is some latitude available in the selection of the spring rate for the elastomeric elements 38, 40, there are a number of design considerations which limit the range within which spring rates may be selected. In any case, with a selected spring rate for the elastomeric elements 38, 40, the restoring forces as a consequence of pylon displacement can be estimated. The position of the fuselage center of gravity when the aircraft is fully loaded is approximately known. As a consequence, the links 12 can be positioned so that the point P will be at a distance below the center of gravity such that these two moments can be made as equal in magnitude as possible.

More specifically, for a given in-plane disturbing force on the pylon 10, it can be assumed that the magnitude of the net force acting on the fuselage and focused at the point P will be equal to the magnitude of the net restoring force acting on the fuselage in the plane of the elastomeric elements. The links 12 can thus be designed so that the position of the point P will make the moment caused by the force at the point P equal in magnitude, although opposite in direction, to the moment caused by the restoring force at the mounting plane.

Thus, moment cancellation can be achieved under ideal conditions. Under most practical operating conditions, near cancellation of moment, or minimization of net moment, can be achieved.

The net force on the fuselage at the point P is a function of the magnitude of the disturbing force on the pylon 10 less the inertial reaction of the pylon 10. Since the inertial reaction of the pylon 10 is a function of the frequency of the vibratory disturbance, the maximum moment cancellation can be achieved at only one frequency. In a helicopter having a two bladed rotor, the design of the mount structure and of the elastomeric elements will be such as to provide this maximum moment cancellation at a frequency equal to "two per rev"; namely, a frequency equal to twice the rotational rate of the rotor blades.

Partial isolation of the fuselage from rotor induced vibratory disturbances is achieved through the use of the inertial reaction of the pylon 10 to provide a counter force in response to the rotor induced vibratory disturbances. Advantage is usually taken of this phenomenon through the employment of elastomeric pylon mounts between pylon and fuselage. The pylon mounts provided by this invention are the non-elastic links 12 and spherical bearings 27. But, this mount structure, like an elastomeric mount structure, also provides or permits pylon displacement. However, by contrast with elastomeric mount structures, the mount structure 12, 27 provides an enhanced amplification of the pylon inertial reaction.

The inertial effect of the pylon is enhanced because the pylon rotates about a focal point P other than its own center of gravity. The further away this focal point P is from the center of gravity of the pylon, the greater will be the enhancement of the pylon inertial reaction. The location of the focal point P at a position well below the center of gravity of the fuselage substantially enhances this inertial reaction of the pylon to in-plane vibratory forces and thus serves to provide an enhanced degree of fuselage isolation.

Since the pylon inertial reaction is enhanced, the magnitude of the force transmitted to the fuselage at the focal point P will be reduced accordingly. Similarly, the magnitude of the restoring force required at the mounting plane will be correspondingly decreased.

The elastomeric elements 38, 40 are in part normally designed or selected to provide some degree of damping and thus, aid in creating stability. However, the bearings 27 are preferably made of a material such as polytetrafluoroethylene (Teflon) so as to provide a significant degree of damping. Accordingly, when damping considerations are taken into account, in addition to restoring force and moment cancellation considerations, a preferred design will involve elastomeric elements 38, 40 and spherical bearings 27 which are in part selected to provide whatever damping is necessary to insure stability in response to vibratory disturbances. It might be noted that Teflon spherical bearings are velocity sensitive and have no break-away characteristic. Thus, employing these bearings to provide damping does not serve to reduce the partial isolation effect discussed above.

Although one embodiment of this invention has been described in some detail, it should be understood that there are other significant embodiments. A significant variation is one in which the links 12, instead of toeing in to provide a focal point P below the fuselage center of gravity, toe out so that the focal point P is substantially above the mounting plane. The brackets 26 on the experimental embodiment illustrated provide a number of holes so that the links 12 can be positioned to have a number of different angular relations relative to the rotor shaft axis X—X. If the links 12 are moved to the outermost opening in the brackets 26, then the extension of the axes of the links 12 intersect at a point substantially above the links. AS long as this focal point is above the center of gravity of the pylon, a cancellation of moments similar to that described in connection with the embodiment shown will occur. The optimum location of the focal point in such an embodiment will depend upon the same considerations as discussed in connection with the embodiment illustrated. Essentially, these are considerations of elastomeric element spring rate and of the degree of isolation achieved through pylon inertial reaction.

The point P is preferably selected to be in line with the rotor shaft axis X—X in order to minimize pitch and roll effects due to the vertical thrust force vector. In operation, the point P will move very slightly as the pylon 10 is displaced. Thus, there will be a moment due to the thrust vector that will become part of the moment balance equation. This, however, is but one of the considerations that may preclude a complete moment cancellation even at the frequency for which maximum moment cancellation is designed; normally, the predominant rotor frequency. This invention does provide a substantial degree of moment cancellation and thus, provides improved pitch and roll fuselage response.

The term "pylon" as used herein designates the gear box, pylon transmission and rotor shaft. There is usage in the art of the term pylon to additionally refer to the rotor and rotor mast. For the sake of consistency, it should be understood that it is the former usage employed in this application.

What is claimed is:

1. In a rotary wing aircraft having rotor blades mounted on a rotor shaft, a pylon mounting system for mounting the pylon on the fuselage comprising:

at least three separate non-resilient mounting links spaced from one another and connected between the pylon and the fuselage to support the pylon on the fuselage, a plurality of universal bearings, one of said universal bearings at each end of each of said links to provide a universal coupling between a first end of each of said links and the pylon and to provide a universal coupling between a second end of each of said links and the fuselage, the longitudinal axis of each of said mounting links intersecting at a predetermined point, said pylon reacting to in-plane forces by tending to rotate about said predetermined point, elastomeric element means connected between the pylon and the fuselage to provide a restoring force upon deflection of the pylon relative to the fuselage, and torque restraining means connected between the pylon and the fuselage to prevent pylon rotation about the rotor shaft axis.

2. The pylon mounting system of claim 1 wherein said predetermined point of intersection is below the center of gravity of the fuselage.

3. The pylon mounting system of claim 2 wherein:

said restoring force provided by said elastomeric element means provides a moment about the center of gravity of the fuselage that is substantially equal in magnitude and opposite in direction to the moment about the center of gravity of the fuselage of whatever in-plane force is focused at said predetermined point.

4. The pylon mounting system of claim 3 wherein said predetermined point of intersection is substantially in line with the rotor shaft axis.

5. The pylon mounting system of claim 2 wherein said predetermined point of intersection is substantially in line with the rotor shaft axis.

6. The pylon mounting system of claim 1 wherein:

said restoring force provided by said elastomeric element means provides a moment about the center of gravity of the fuselage that is substantially equal in magnitude and opposite in direction to the moment about the center of gravity of the fuselage of whatever in-plane force is focused at said predetermined point.

7. The pylon mounting system of claim 6 wherein said predetermined point of intersection is substantially in line with the rotor shaft axis.

8. The pylon mounting system of claim 1 wherein said predetermined point of intersection is substantially in line with the rotor shaft axis.

* * * * *